(12) United States Patent
Kinoshita

(10) Patent No.: US 9,664,838 B2
(45) Date of Patent: May 30, 2017

(54) ILLUMINATION DEVICE HAVING A LIGHT GUIDE HAVING CONVEX AND CONCAVE PATTERNS

(71) Applicant: KURARAY CO., LTD., Kurashiki-shi (JP)

(72) Inventor: Seiji Kinoshita, Tsukuba (JP)

(73) Assignee: KURARAY CO., LTD., Kurashiki-shi (JP)

( * ) Notice: Subject to any disclaimer, the term of this patent is extended or adjusted under 35 U.S.C. 154(b) by 60 days.

(21) Appl. No.: 14/390,672

(22) PCT Filed: Apr. 4, 2013

(86) PCT No.: PCT/JP2013/060296
§ 371 (c)(1),
(2) Date: Oct. 3, 2014

(87) PCT Pub. No.: WO2013/151120
PCT Pub. Date: Oct. 10, 2013

(65) Prior Publication Data
US 2015/0092443 A1    Apr. 2, 2015

(30) Foreign Application Priority Data

Apr. 5, 2012 (JP) ................................. 2012-086845

(51) Int. Cl.
*F21V 8/00* (2006.01)
*F21S 8/04* (2006.01)
(Continued)

(52) U.S. Cl.
CPC .............. *G02B 6/0038* (2013.01); *F21S 8/04* (2013.01); *G02B 6/0036* (2013.01);
(Continued)

(58) Field of Classification Search
CPC ..... G02B 6/0036; G02B 6/0038; G02B 6/0055
See application file for complete search history.

(56) References Cited

U.S. PATENT DOCUMENTS

2001/0046365 A1* 11/2001 Bohle ....................... F21S 8/04
385/146
2005/0117370 A1   6/2005 Kawashima et al.
(Continued)

FOREIGN PATENT DOCUMENTS

CN       1667486 A    9/2005
CN       1993582 A    7/2007
(Continued)

OTHER PUBLICATIONS

Extended European Search Report issued Dec. 8, 2015 in Patent Application No. 13772331.8.
(Continued)

*Primary Examiner* — Anh Mai
*Assistant Examiner* — Steven Horikoshi
(74) *Attorney, Agent, or Firm* — Oblon, McClelland, Maier & Neustadt, L.L.P.

(57) ABSTRACT

Provided is an edge-light type illumination device capable of increasing luminance directly thereunder and capable of providing anisotropy to the luminance distribution. Light to be emitted from an emission surface (2d) of a light-guide plate (2) fulfills a condition (1) $E_{total}/E_m > 2.0$ and a condition (2) $E_{total}(20°,0°)/E_{total}(20°,90°) > 1.2$. Here, average intensity of light to be emitted from the emission surface (2d) is Em and total light intensity of the light to be emitted in a Z-axis direction is Etotal, the total light intensity Etotal(20°, 0°) of the light to be emitted is $\Sigma\Delta Pi(20°,0°)/\Delta\omega$ when an angle θ of the light to be emitted relative to a Z-axis direction is 20° and an angle φ of the light to be emitted relative to an X-axis direction is 0°, and the total light intensity Etotal(20°, 90°) of the light to be emitted from the (Continued)

emission surface (*2d*) is $\Sigma\Delta P_i(20°,90°)/\Delta\omega$ when the angle $\theta$ of the light to be emitted relative to the Z-axis direction is 20° and the angle $\phi$ of the light to be emitted relative to the X-axis direction is 90°.

8 Claims, 8 Drawing Sheets

(51) Int. Cl.
    *F21Y 105/00*      (2016.01)
    *F21Y 101/00*      (2016.01)
    *F21Y 115/10*      (2016.01)

(52) U.S. Cl.
    CPC ........ *G02B 6/0055* (2013.01); *F21Y 2101/00* (2013.01); *F21Y 2105/00* (2013.01); *F21Y 2115/10* (2016.08); *G02B 6/0068* (2013.01)

(56) References Cited

U.S. PATENT DOCUMENTS

| | | |
|---|---|---|
| 2006/0083508 A1 | 4/2006 | Tenmyo |
| 2008/0130316 A1 | 6/2008 | Kinoshita et al. |
| 2009/0129058 A1 | 5/2009 | Tokita et al. |
| 2010/0315833 A1 | 12/2010 | Holman et al. |
| 2010/0328576 A1 | 12/2010 | Kinoshita |
| 2011/0255304 A1 | 10/2011 | Kinoshita |
| 2012/0294037 A1 | 11/2012 | Holman et al. |
| 2013/0107572 A1 | 5/2013 | Holman et al. |

FOREIGN PATENT DOCUMENTS

| | | |
|---|---|---|
| CN | 100412680 C | 8/2008 |
| CN | 101321986 A | 12/2008 |
| CN | 101932872 A | 12/2010 |
| CN | 102003683 A | 4/2011 |
| CN | 102265084 A | 11/2011 |
| EP | 1 574 897 A1 | 9/2005 |
| JP | 8-17209 A | 1/1996 |
| JP | 10-160938 A | 6/1998 |
| JP | 2005-258011 A | 9/2005 |
| JP | 2007-180021 A | 7/2007 |
| JP | 2011-512006 | 4/2011 |
| KR | 10-2005-0041965 A | 5/2005 |
| KR | 10-2008-0004138 A | 1/2008 |
| KR | 10-2008-0077386 A | 8/2008 |
| KR | 10-2011-0086067 A | 7/2011 |
| WO | WO 2007/064002 A1 | 6/2007 |
| WO | WO 2009/099547 A2 | 8/2009 |

OTHER PUBLICATIONS

International Search Report issued Jul. 9, 2013 in PCT/JP2013/060296.

Combined Chinese Office Action and Search Report issued Aug. 31, 2015 in Patent Application No. 201380029580.0 (with English language translation of categories of cited documents).

Office Action issued Feb. 25, 2016 in Korean Patent Application No. 10-2014-7030855.

\* cited by examiner

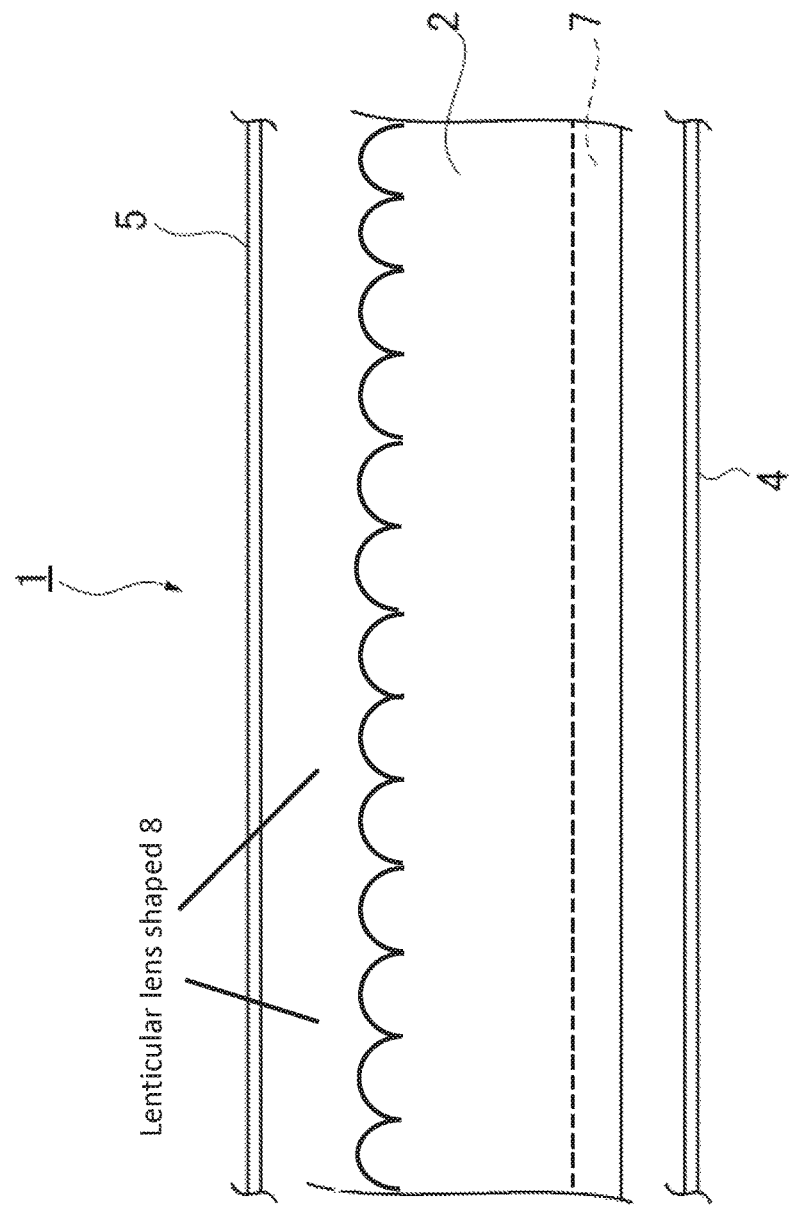

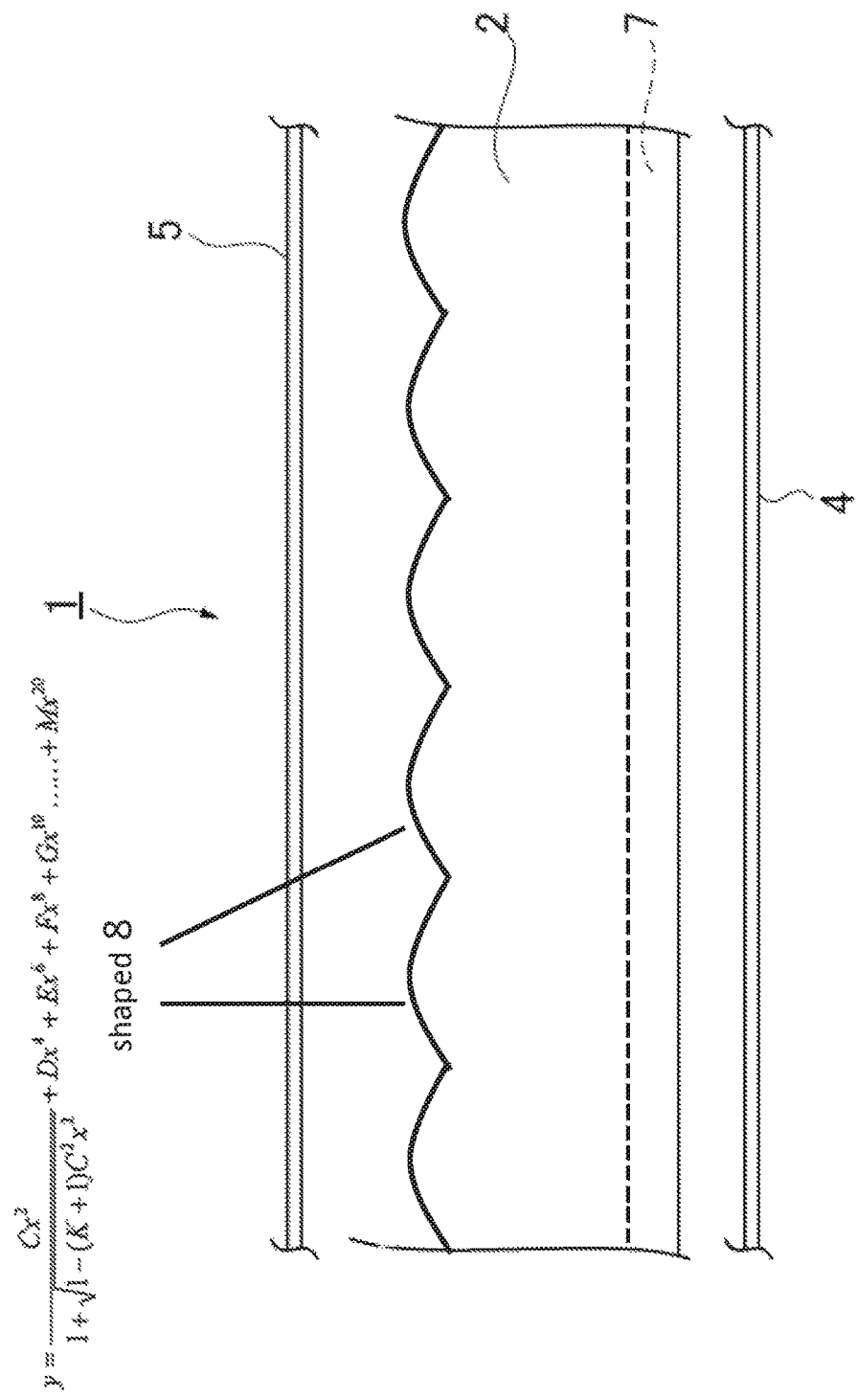

ILLUMINATION DEVICE HAVING A LIGHT GUIDE HAVING CONVEX AND CONCAVE PATTERNS

TECHNICAL FIELD

The present invention relates to an edge light-type illumination device which receives, into a light-guide plane, light from a primary light source, such as an LED, arranged on at least one side face of the light-guide plate and emits light from one main face (emission surface) of the light-guide plate. Specifically, the present invention relates to an edge light-type illumination device which is suitable as lighting equipment to be mounted and used on a ceiling of an office or a residence and the like, in particular.

BACKGROUND ART

In recent years, with improved luminous efficiency and lower prices of LEDs, illumination devices having LEDs as a light source have become popular. Of the illumination devices using an LED light source, as an illumination device to be mounted and used on a ceiling and the like of an office or a residence and the like, in particular, a direct-underneath type illumination device which has LEDs arranged as dots in a grid or radially on the plane on the side of a bottom surface opposed to an emission surface of this illumination device has been popular.

However, since LEDs are arranged as dots directly on a bottom surface in the direct-underneath type illumination device, the illumination device cannot only be looked directly because of its strong glare but also lacks uniformity of brightness as a planar luminous body. Although a milky diffuser plate and the like are used as a cover for the illumination device to alleviate these problems, it reduces utilization efficiency of light.

On the one hand, an edge-light type has been known as a backlight for a liquid crystal display device in a liquid crystal television or a personal computer and the like. A transparent plate-shaped light-guide plate made of a transparent polymer such as PMMA (polymethyl methacrylate) or the like is installed in an edge-light type backlight.

White dots (scattering dots) are printed on a bottom surface of this light-guide plate. Through adjustment of size, density and the like of the dots, a part of light propagating in the light-guide plate is scattered when hitting the white dots, and emitted in a visible (emission surface) direction.

The edge-light type backlight can illuminate with planar light by receiving, into a light-guide plane, light from a primary light source (LEDs or the like) arranged on at least one side face of a light-guide plate and emitting light from one entire main surface (emission surface). Since the primary light source is not looked directly in the edge-light type, it has no glare and is excellent in the quality of appearance.

Thus, this edge-light type backlight has been applied to lighting equipment which is mounted and used on a ceiling of an office or a residence and the like (See Patent Literature 1, for example). Behind the background, thinning of the lighting equipment with an LED as a light source becomes possible due to improved luminous efficiency and lower prices of LEDs, thereby enabling weight reduction of illumination devices. In addition to this, since dimming control, which is a feature of an LED, is possible, the edge-light type illumination device with the LED as a light source has become popular.

CITATION LIST

Patent Literature

Patent Literature 1: Japanese Patent Application Publication No. Hei 10-160938

SUMMARY OF THE INVENTION

Technical Problem

When an edge-light type illumination device as described in Patent Literature 1 is applied to lighting equipment to be mounted and used on a ceiling of an office or a residence and the like, this illumination device (edge-light type lighting equipment) can illuminate directly thereunder and surroundings thereof by emitting planar light from a main surface (emission surface) of, for example, an almost square-shaped light-guide plate.

However, if the light-guide plate used in the edge-light type illumination device has white dots (scattering dots) printed, light to be emitted from the main surface (emission surface) of the light-guide plate is isotropically distributed. Thus, the illumination device cannot brightly illuminate a front direction, and the utilization efficiency of light is not high.

In addition, it cannot be stated in general that an illumination device to be mounted and used on a ceiling and the like of an office or a residence and the like utilizes light effectively. For example, in an office, it is only necessary to illuminate with high luminance a specific range such as on a desk or in a passage and the like, and making the ceiling have high luminance does not make sense. It is necessary to illuminate in a luminance pattern so that luminance directly under the illumination device is high.

In addition, in a conventional edge-light type illumination device, since planar light emitted from a main surface (emission surface) of a light-guide plate spreads isotropically, the illumination device cannot illuminate so as to increase luminance thereunder. Furthermore, the planar light emitted from the main surface (emission surface) of the light-guide plate isotropically spreads and illuminates. For this reason, when there is a demand for providing anisotropy to the luminance distribution, depending on an application of illumination, the illumination device cannot cope with this demand.

Hence, an objective of the present invention is to provide an edge-light type illumination device capable of increasing luminance directly thereunder and capable of providing anisotropy to the luminance distribution.

Solution to Problem

In order to achieve the above-mentioned objective, the invention according to claim 1 is an edge-light type illumination device including: a light-guide plate; and a primary light source is installed on at least one side face of the light-guide plate, in which the light-guide plate has an emission surface, a bottom surface opposed to the emission surface, and a light-receiving end face for receiving light emitted from the primary light source provided on the at least one side surface, wherein when a normal line of an X-Y plane constituted of an X-axis and a Y-axis orthogonal to the X-axis is represented as a Z-axis, the primary light source is arranged parallel to the X-axis, the light-guide plate is arranged parallel to the X-Y plane, and the light-receiving end surface of the light-plate guide is parallel to an X-Z plane, the light-guide plate has a plurality of concave-streak patterns which are formed at a predetermined pitch on the bottom surface and parallel to an X-axis direction and a plurality of convex-streak patterns which are formed at a predetermined pitch on the emission surface and parallel to a Y-axis direction, when average intensity of light to be emitted from the emission surface of the light-guide plate is Em, and when total light intensity of light emitted from the emission surface of the light-guide plate in the Z-axis direction is Etotal, light emitted from the emission surface of the light-plate guide fulfills a condition (1) shown below, and

[1] The correct expression for condition (2) is found in Applicants' priority document JP 2013/060296, published as WO 2013/151120.

if the total light intensity Etotal(20°, 0°) of the light to be emitted from the emission surface of the light-plate guide is $$E_{total}(20°,0°)=\Sigma \Delta Pi(20°,0°)/\Delta\omega$$

when an angle θ of the light to be emitted from the emission surface of the light-plate guide relative to the Z-axis is 20° and an angle φ of the light to be emitted from the emission surface relative to the X-axis is 0°, and if the total light intensity Etotal(20°, 90°) of the light to be emitted from the emission surface of the light-plate guide is $$E_{total}(20°,0°)=\Sigma \Delta Pi(20°,0°)/\Delta\omega$$

when the angle θ of the light to be emitted from the emission surface of the light-plate guide relative to the Z-axis is 20°, and the angle φ of the light to be emitted from the emission surface relative to the X-axis is 90°, the light to be emitted from the emission surface of the light-plate guide also fulfills a condition (2) shown below:

$$E_{total}/E_m > 2.0 \quad \text{Condition (1)}$$

$$E_{total}(20°,0°)/E_{total}(20°,90°) > 1.2 \quad \text{Condition (2)}$$

provided that the ΔPi(θ, φ) is a light flux emitted into a minute solid angle of Δω from each compartment in a (θ, φ) direction when the emission surface of the light-guide plate is partitioned to a plurality of minute compartments, and Σ is a sum of the plurality of minute compartments of the emission surface of the light-guide plate.

In the invention according to claim 2, each of the convex-streak patterns formed on the emission surface of the light-guide plate has a cross section shaped like a trapezoid or a lenticular lens or a parabola.

In the invention according to claim 3, each of the convex-streak patterns formed on the emission surface of the light-guide plate has a cross section shaped like a curved line following the expression below.

$$y = \frac{Cx^2}{1+\sqrt{1-(K+1)C^2x^2}} + Dx^4 + Ex^6 + Fx^8 + Gx^{10} \ldots + Mx^{20} \quad \text{[Math 1]}$$

$$K = -1$$

$C=47.31523$

Quartic $D=-29846$
Sextic $E=362207392$
Eight-degree $F=-2776608932701$
Tenth-degree $G=8967392099183360$
Twelfth-degree $H=-22138674875790700000$
Fourteenth-degree $I=3.4149338436526 \times 10^{22}$
Sixteenth-degree $J=-3.18652196429692 \times 10^{25}$
Eighteenth-degree $L=1.64310378517547 \times 10^{28}$
Twentieth-degree $M=-3.5868000886891 \times 10^{30}$ In the invention according to claim 4, each of the concave-streak patterns formed on the bottom surface of the light-guide plate has a V-shaped cross section and an apex angle is set to 75° to 105°.

In the invention according to claim 5, the concave-streak patterns are formed more densely as they move away from the light-receiving end face.

In the invention according to claim 6, the illumination device includes: a reflective sheet for reflecting light on the side of the bottom surface of the light-guide plate; and an optical sheet on the side of the emission surface of the light-guide plate.

In the invention according to claim 7, the illumination device includes a reflective sheet for reflecting light on the side of the bottom surface of the light-guide plate.

In the invention according to claim 8, the illumination device is configured to be mounted on a ceiling to be used as a ceiling illumination.

Advantageous Effect of Invention

According to the present invention, an edge-light type illumination device having excellent luminance directly thereunder and having anisotropy in the luminance distribution.

BRIEF DESCRIPTION OF DRAWINGS

FIG. 2A is an alternative cross-section of a lenticular lens. FIG. 2C is an alternative cross-section of a curved convex section.

DESCRIPTION OF EMBODIMENTS

Figure 1:
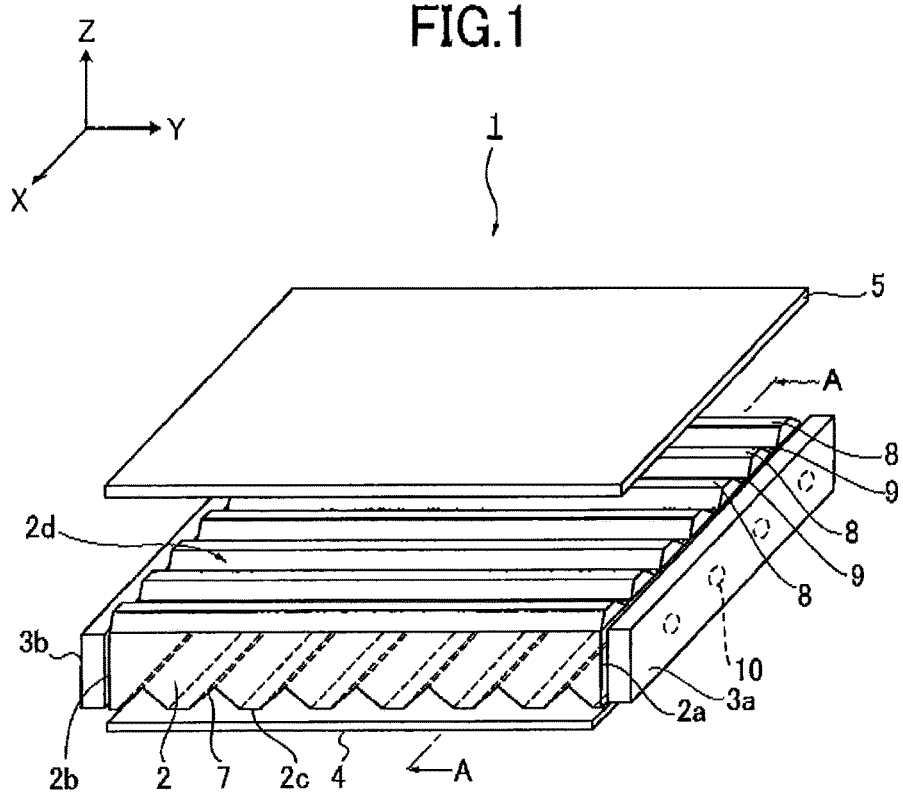
FIG. 1 is an exploded perspective view of an edge-light type illumination device according to an embodiment of the present invention.
Figure 2:
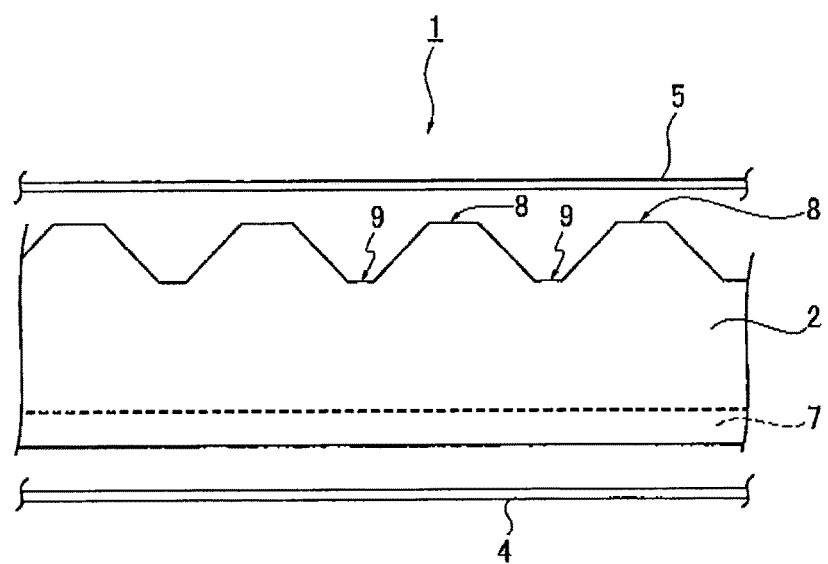
FIG. 2 is a cross-sectional view of a line A-A in FIG. 1.

FIG. 1 is an exploded perspective view of an edge-light type of illumination device according to an embodiment of the present invention, and FIG. 2 is a cross-sectional view of a line A-A in FIG. 1. In addition, in the edge-light type illumination device 1 according to the embodiment, an X-axis direction, a Y-axis direction, and a Z-axis direction are defined as shown in the figure, the Y-axis direction is a horizontal direction of this illumination device 1, the X-axis direction a vertical direction, and the Z-axis direction a light emission direction.

As shown in FIG. 1 and FIG. 2, the edge-light type illumination device 1 according to the embodiment includes, as main component members, a light-guide plate 2 which is a transparent structure formed of transparent resin (acrylic resin, for example), luminous units 3a, 3b respectively arranged on opposite sides 2a, 2b (hereinafter referred to as "light-receiving end faces" in the horizontal direction (Y-axis direction) of the light-guide plate 2, a reflective sheet 4 installed on the side of a back face 2c (hereinafter referred to as a "bottom surface") of the light-guide plate 2, and a diffusion sheet 5 as an optical sheet installed on the side of the front face 2d (hereinafter referred to as an "emission surface"). In addition, when this illumination device is installed on a ceiling of an office or a residence and the like, the reflective sheet 4 side is located on a ceiling surface, and light fluxes are emitted from the diffusion sheet 5 side to the downside (floor surface side).

A plurality of concave streaks 7, which extend in the vertical direction (X-axis direction), are formed at regular intervals on the bottom surface 2c of the light-guide plate 2. In addition, on the emission surface 2d of the light-guide plate 2, a plurality of convex streaks 8, which extend in the horizontal direction (Y-axis direction) and have a cross section shaped like a trapezoid, are formed at a predetermined pitch to sandwich concave streaks 9, which extend in the horizontal direction (Y-axis direction) and have a cross section shaped like a trapezoid (details of the light-guide plate 2 will be described below).

The luminous units 3a, 3b as a primary light source are respectively arranged along the vertical direction (X-axis direction) on both sides of the light-guide plate 2 in the horizontal direction (Y-axis direction), and a plurality of LEDs (light-emitting diodes) 10 as a light source are linearly arranged at regular intervals along the vertical direction (X-axis direction) of the light-guide plate 2 in the respective luminous units 3a, 3b. An arrangement interval of the LEDs 10 is about a few millimeters to 20 mm, for example. Note that a light source may be a continuous light source such as a cold cathode tube, in addition to the LEDs 10.

Light emitted from the respective LEDs (light sources) 10 of the respective luminous units 3a, 3b is emitted from the light-receiving end faces 2a, 2b on the both sides of the light-guide plate 2 in the horizontal direction (Y-axis direction) in the light-guide plate 2.

The reflective sheet 4 has a capability of having light emitted out of the bottom surface 2c of the light-plate guide 2 of light received from the light-receiving end faces 2a, 2b on the both sides of the light-plate guide 2 enter the light-plate guide 2 again. For this reflective sheet 4, a reflective sheet having the reflectivity of 95% or higher is desirable as it has high light utilization efficiency. Materials for the reflective sheet 4 include a metal foil such as aluminum, silver, stainless and the like, white painting, foamed PET (polyethylene terephthalate) resin and the like.

A diffusion sheet 5 installed on the side of the emission surface 2d, which is the front face side (front side) of the light-guide plate 2, has a capability of moderately making uniform light emitted from the emission surface 2d of the light-guide plate 2 to control light-dark irregularity and improve appearance.

The quality of appearance is valued in an illumination device used on a ceiling of an office or a residence since a luminous surface of the illumination device is directly viewed. Thus, one or more diffusion sheets may be used. The diffusion sheet 5 may be a sheet-shaped object made of resin (PMMA, PC and the like, for example) having diffusibility or a three-dimensionally processed protective cover which is made by thermally molding these sheets. On the one hand, even in an office or a residence, indirect illumination in which an illumination device is not directly viewed does not require use of a diffusion sheet or a diffusion plate. A transparent cover and the like may be provided on the emission side to protect the illumination device against dust.

(Configuration of the Bottom Surface 2c of the Light-Guide Plate 2)

As shown in FIG. 1, the concave streaks 7 formed at a predetermined pitch on the bottom surface 2c of the light-guide plate 2. These concave streaks 7 have a V-shaped cross section and extend in the X-axis direction. In addition, patterns of the concave streaks 7 are formed more densely as they move away from the light-receiving end faces 2a, 2b.

For the concave streaks 7 having the V-shaped cross section which are formed on the bottom surface 2c of the light-guide plate 2, an apex angle is set to 75° to 105°. In addition, height (depth) of the concave streaks 7 formed on the bottom surface 2c of the light-guide plate 2 is set in a range of about 0.001 mm to 0.1 mm.

Then, as in the embodiment, if the cross section of the concave streaks 7 formed on the bottom surface 2c of the light-guide plate 2 is V-shaped, the V-shaped concave streaks 7 are formed parallel to the light-receiving end faces 2a, 2b, which can thus increase the luminance in the front direction of light emitted from the emission surface 2d if the apex angle of the V-shaped concave streaks 7 is set to the range mentioned above. In addition, the concave streaks 7 formed on the bottom surface 2c of the light-guide plate 2 are not necessarily concave streaks connecting from an edge to an edge of the light-guide plate 2, and may be such that they are about a few times to several thousand times as high as the height of the concave streaks 7.

In the following, the principle that brightness in the front direction improves when the concave streaks (an apex angle is close to 100°) having the V-shaped cross section are formed on the bottom surface 2c of the light-guide plate 2 will be described.

In the illumination device 1 shown in FIG. 1, while light entering from the light-receiving end faces 2a, 2b of the light-guide plate 2 may be reflected in a predetermined direction at the V-shaped concave streaks 7 formed on the bottom surface 2c of the light-guide plate 2 and then emitted from the emission surface 2d or may pass through the V-shaped concave streak 7, be emitted once from the bottom surface 2c of the light-guide plate 2, be diffused by the reflective sheet 4 arranged in the lower part, enter the light-guide plate 2 again and then be emitted from the emission surface 2d, light emitted in the front direction is mainly light emitted in a predetermined direction at the V-shaped concave streaks 7 on the bottom surface 2c.

Figure 3:
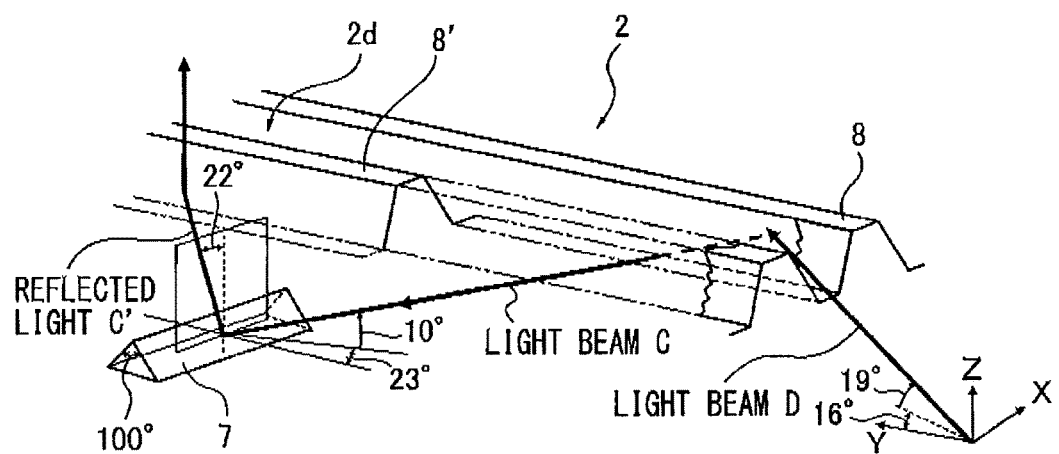
FIG. 3 is a view illustrating how a cross section formed on a bottom surface of a light-guide plate of the illumination device in the embodiment of the present invention receives light on a slant face of a V-shaped concave streak and reflects it to the side of an emission surface.

Of light which is propagating on the emission surface 2d and the bottom surface 2c of the light-guide plate 2 while totally reflecting on a surface parallel to the X-Y plane, light C as shown in FIG. 3 may enter a slant face of the V-shaped concave streak 7 provided on the bottom surface 2c of the light-guide plate 2. Note that in FIG. 3, an elevation angle of the light C to the slant face of the concave streak 7 is 10°, and an angle which makes to the Y-axis is 23°.

The light C is totally reflected on the slant face of the V-shaped concave streak 7 as reflected light C' in a direction in which an angle it makes to the Z-axis on a plane parallel to the light-emitting end face (or the X-Z plane) is 22 degrees. Some of this reflected light is emitted in the front direction (Z-axis direction) when it is emitted from the slant face of the V-shaped convex streak (convex streak 8 in FIG. 3) formed on the emission surface 2d and having a trapezoid-shaped cross surface. Thus, the luminance of the light to be emitted in the front direction can be improved.

Furthermore, of light propagating within the light-guide plate 2, light D is deflected to the light C by being totally reflected on the slant-face of the convex streak (convex streak 8 in FIG. 3) formed on the emission surface 2d and having a trapezoid-shaped cross section. Specifically, the light C is doubled by the slant face of the convex streak (convex streak 8 in FIG. 3) formed on the emission surface 2d and having the trapezoid-shaped cross section, thus making it possible to improve the luminance of light to be emitted in the front direction.

Note that in FIG. 3, the light D makes an angle of 19° with the X-Y plane and an angle of 16° with the Y-axis.

(Configuration of the Emission Surface 2d of the Light-Guide Plate 2)

As shown in FIG. 2, the plurality of convex streaks 8 formed at a predetermined pitch and having a trapezoid-shaped cross section and the concave streaks 9 sandwiched between the respective adjacent convex streaks 8 and having a trapezoid-shaped cross section are formed on the emission surface 2d of the light-guide plate 2. These convex streaks 8 and the concave streaks 9 are extended in the Y-axis direction (horizontal direction).

Height of the convex streaks 8 in general is set in a range of 0.001 to 0.1 mm and a slant angle of the convex streaks 8 in general is set in a range of 30 to 60°, for example.

Figure 2B:
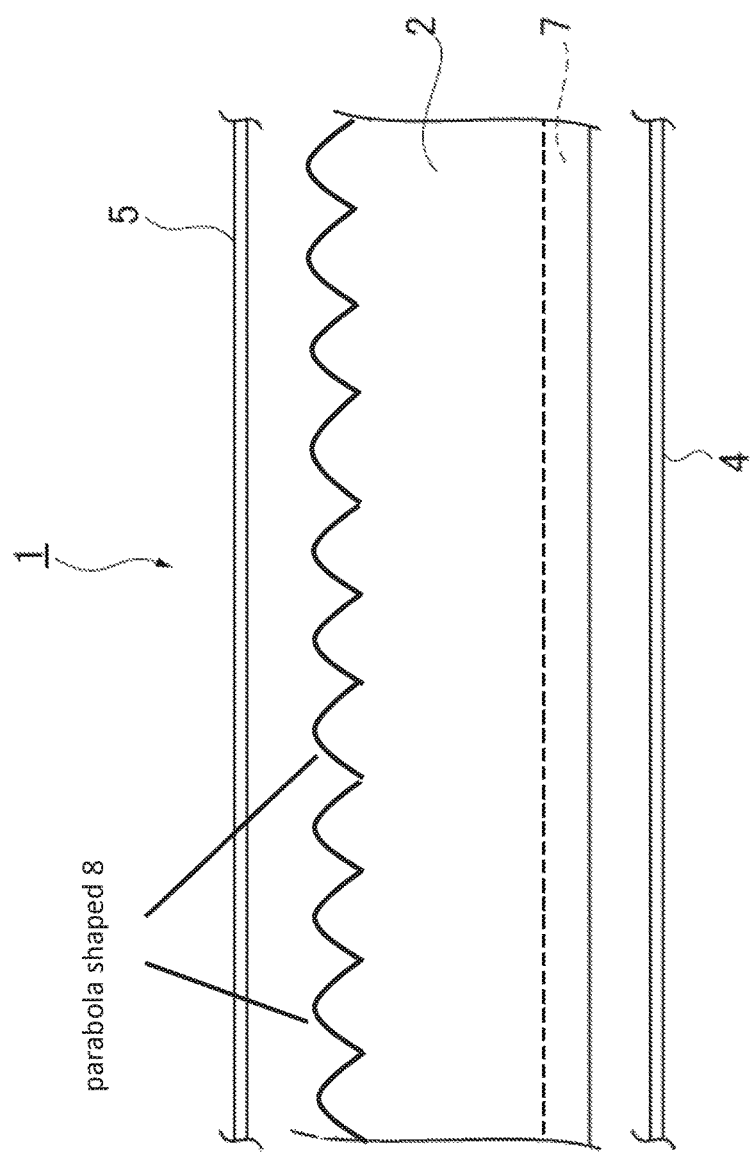
FIG. 2B is an alternative cross-section of parabola.

In addition, while in the above description, the convex streaks 8 formed on the emission surface 2d of the light-plate guide 2 are trapezoid-shaped (as in FIG. 2), they may be shaped like a lenticular lens (as in FIG. 24) or a parabola (as in FIG. 2B), or may be a curved line specified in the following expression (1) (as in FIG. 2C).

[Math 2]

$$y = \frac{Cx^2}{1 + \sqrt{1 - (K+1)C^2 x^2}} + Dx^4 + Ex^6 + Fx^8 + Gx^{10} \ldots + Mx^{20}$$

$$K = -1$$

Expression (1)

In addition, this expression (1) is a general expression which does not limit respective parameters K, C, D to M in the expression (8), where at least one of D to M is not 0. In particular, it is preferable that K in the expression (1) is −1.

Then, since the illumination device 1 of the present invention has the V-shaped concave streaks 7 formed on the bottom surface 2c of the above-mentioned light-guide plate 2 and the convex streaks 8 formed on the emission surface 2, it becomes possible for the illumination device to further increase the luminance directly thereunder and provide anisotropy in the luminance distribution, as described below.

Figure 4A:
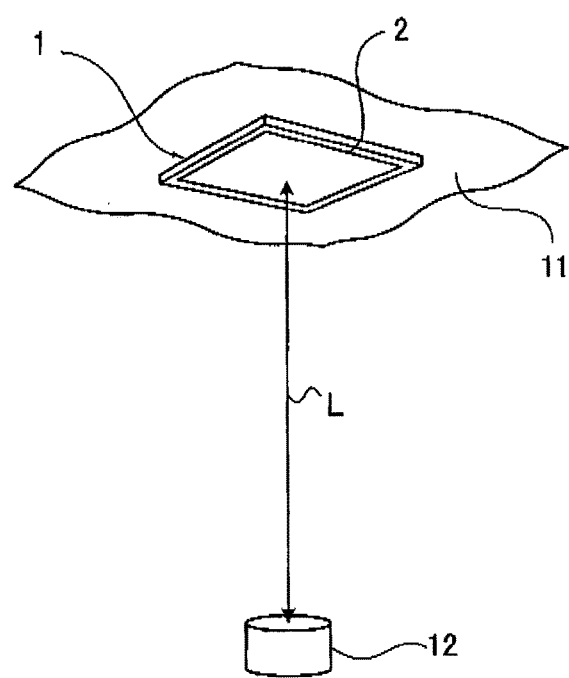
FIG. 4A is a view illustrating a state in which a luminance measuring instrument is placed vertically under an edge-light type illumination device and spaced therefrom by distance L.
Figure 4B:
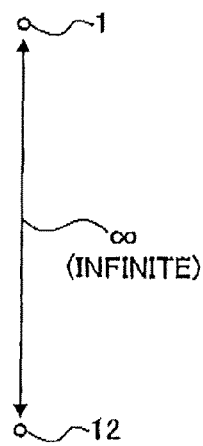
FIG. 4B is a view showing a state in which it is assumed that distance between the edge-light type illumination device and the luminance measuring instrument is infinite.

When the direct-underneath luminance is measured with the above-mentioned edge-light type illumination device 1 installed on the ceiling 11 and the luminance measuring instrument 12 placed vertically thereunder and spaced by distance L, as shown in FIG. 4A, it is difficult to objectively determine to what extent the direct-underneath luminance is excellent as measured values thereof vary. Similarly, it is also difficult to objectively determine how much anisotropy in the luminance distribution the illumination device has.

For example, when a distance to be measured is same, a measured value of the direct-underneath luminance also increases as size of a light-guide plate becomes larger, and a measured value of the direct-underneath luminance decreases as the size of the light-guide plate becomes smaller. Thus, simple measurement of the direct-underneath luminance of illumination devices having different-sized light-guide plates does not allow an objective evaluation of whether or not the direct-underneath luminance is excellent.

Hence, as a result of observation of conditions for judging how excellent the direct-underneath luminance is and whether or not it is excellent, without relying on size of a light-plate guide or a measurement method of a measuring instrument, and of conditions for judging whether or not an illumination device has anisotropy in the luminance distribution, the inventor found out that the condition (1), to be described below, makes it possible to determine how excellent the direct-underneath luminance is and whether or not it is excellent and that the condition (2), to be described below, makes it possible to determine whether or not an illumination device has anisotropy in the luminance distribution.

(Description of the Condition (1) for Evaluating the Direct-Underneath Luminance)

If it is assumed that distance between the illumination device 1 and the measuring instrument 12 is indefinite (∞) as shown in FIG. 9B, it can be considered that the illumination device 1 is a minute point and the measuring instrument 12 is also a minute point.

Figure 5:
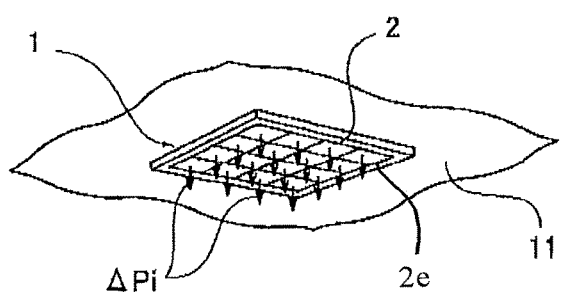
FIG. 5 is a view illustrating light fluxes emitted from respective compartments when the emission surface of the light-guide plate is partitioned to a plurality of minute compartments.

In this case, as shown in FIG. 5, when the emission surface of the square-shaped light-guide plate 2 is partitioned to a plurality of minute compartments 2e, light fluxes ΔPi(θ=0) to be emitted from respective compartments all face a directly underneath direction. Thus, the total light intensity $E_{total}$ (θ=0) of all light fluxes emitted from the emission surface of the light-guide plate 2 in FIG. 5 in the directly underneath direction can be expressed by the following expression (2).

Figure 7A:
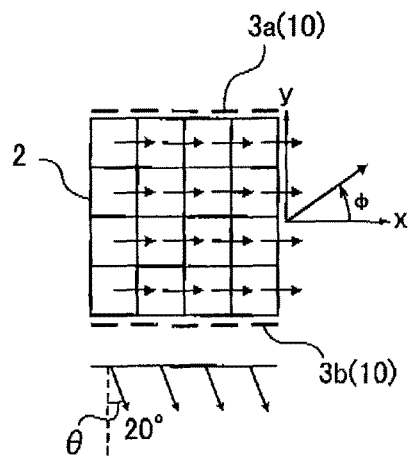
FIG. 7A is a view for illustrating anisotropy of the luminance distribution of the light flux emitted from an emission surface of a light-guide plate.

In addition, θ represents an angle of the light fluxes from the emission surface relative to the Z-axis direction, and θ=0 represents the emission direction of the light fluxes is the directly underneath direction (Z-axis direction) (see (A) in FIG. 7A). ΔPi (θ, φ) is defined as a light flux to be emitted into a minute solid angle from each compartment in a (θ, φ) direction when the emission surface of the light-guide plate is partitioned into a plurality of minute compartments.

$$E_{total}(\theta=0) = \Sigma \Delta Pi(\theta=0)/\Delta \omega \qquad \text{Expression (2)}$$

In addition, a general expression of the total light intensity $E_{total}$ (θ=0) of all light fluxes emitted from the emission surface of the light-guide plate 2 can be expressed by the following expression (3). Note that φ represents an angle of light to be emitted from the emission surface relative to the X-axis direction with the Z-axis as a center (see FIG. 7A).

$$E_{total}(\theta,\phi)=\Sigma\Delta Pi(\theta,\phi)/\Delta\omega \qquad \text{Expression (3)}$$

Then, when average intensity of light to be emitted from the emission surface of the light-guide plate 2 is $E_m$ and all light fluxes to be emitted from the emission surface of the light-guide plate 2 are $P_{all}$, $E_m$ can be expressed by the following expression (4). Note that a unit of light fluxes is lumen (lm).

$$E=P_{all}/2\pi \qquad \text{Expression (4)}$$

Then, through calculation of a ratio (direct-underneath intensity/average intensity (=$E_{total}$(θ=0)/$E_m$)) of a value of the total light intensity (direct-underneath intensity) $E_{total}$ of light to be emitted from the emission surface of the light-plate guide 2 in the directly underneath direction to a value of the average intensity $E_m$ of light fluxes to be emitted from the emission surface of the light-plate guide 2, it is possible to objectively evaluate from a value of this direct-underneath intensity/average intensity (hereinafter referred to as a "direct-underneath luminance evaluation value") whether or not the direct-underneath luminance is excellent.

Figure 6:
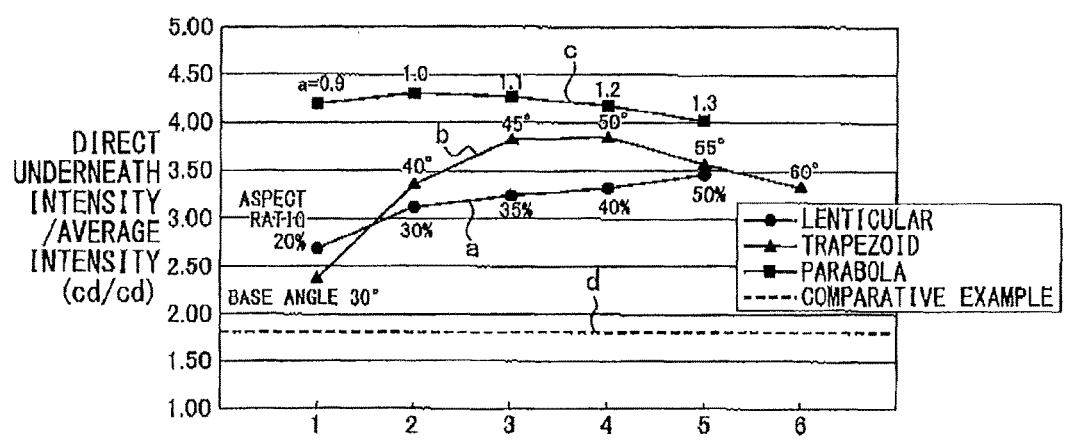
FIG. 6 is a view showing results of evaluation values (direct-underneath intensity/average intensity) of luminance directly under the illumination device of the present invention.

FIG. 6 is experimental data showing results of the direct-underneath luminance evaluation values when the convex streaks 8 formed on the emission surface 2d of the light-guide plate 2 of the illumination device 1 described above are shaped like a lenticular lens (symbol a), a trapezoid (symbol b), and a parabola (symbol c). Note that the V-shaped concave streaks 7 having the apex angle of 100° are formed on the bottom surface 2c of the light-guide plate 2.

In addition, the symbol d in FIG. 6 is a direct-underneath luminance evaluation value in a light-plate guide for comparison. This light-guide plate for comparison has both faces which are planar and on each of which neither V-shaped concave streaks are formed on a bottom surface nor convex streaks are formed on an emission surface, unlike the present invention, and a plurality of dot-like reflective areas are formed on the bottom surface.

FIG. 6 shows values when an aspect ratio is changed to 20(%), 30(%), 35(%), 40(%) and 50(%) in the case of the lenticular lens shape (symbol a), those when a base angle is changed to 30°, 40°, 45°, 50°, 55°, and 60° in the case of the trapezoid shape (symbol b), and those when a constant a of a quadratic function is changed to 0.9, 1.0, 1.1, 1.2, and 1.3 in the case of the parabola shape (symbol c). Note that the horizontal axis of FIG. 6 shows types (1 to 6) of illumination devices having light-guide plates which are respectively formed by changing these numeric values.

In addition, the aspect ratio is r/2R×100(%) when a radius of a circle tracing a vertical cross section of a lenticular lens is R, and distance from the top of a circular arc forming the lenticular lens to a string is r.

As is obvious from the experimental results of the direct-underneath luminance evaluation values of FIG. 6, in the light-guide plate for comparison (configuration having the dot-like reflective areas on the bottom surface) of the symbol d, a direct-underneath luminance evaluation value was about 1.8. In contrast to this, like the light-guide plate 2 of the present invention, if shape of the convex streak 8 of the emission surface 2d is shaped like the lenticular lens (symbol a), the trapezoid (symbol b), or the parabola (symbol c) and the V-shaped concave streaks 7 are formed on the bottom surface 2c, the direct-underneath luminance evaluation value is about 2.3 to 4.7, from which it is seen that the emission rate in the directly underneath direction is higher than the light-plate guide for comparison (symbol d).

Thus, since it can be determined that the illumination device has the excellent direct-underneath luminance when the value (direct-underneath luminance evaluation value) of the direct-underneath intensity/average intensity (=$E_{total}$(θ=0)/$E_m$) is at least 2.0 or higher, the condition (1) described above is as follows:

$$E_{total}(\theta=0)/E_m > 2.0 \qquad \text{Condition (1)}$$

(Description of the Condition (2) for Evaluating Anisotropy of the Luminance Distribution)

Figure 7B:
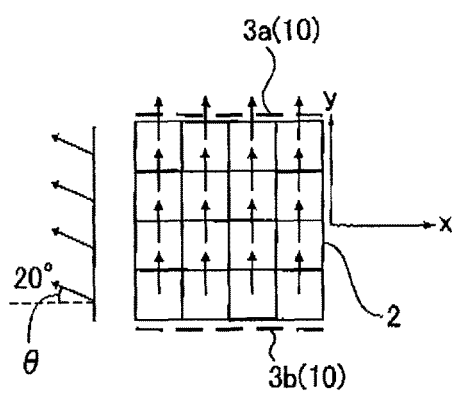
FIG. 7B is a view for illustrating anisotropy of the luminance distribution of the light fluxes emitted from the emission surface of the light-guide plate.

FIG. 7A and FIG. 7B are views for illustrating anisotropy of the luminance distribution of light to be emitted from the emission surface of the light-guide plate 2.

FIG. 7A shows that the angle θ of light to be emitted from the emission surface relative to the Z-axis direction is 20° and that the angle φ of the light to be emitted from the emission surface relative to the X-axis direction is 0°. In the case of FIG. 7A, the situation in which the light from the emission surface of the light-guide plate 2 is obliquely emitted downward obliquely in the X-axis direction (direction parallel to an arrangement direction of the respective luminous units 3a, 3b (LEDs 10)) is shown.

In addition, FIG. 7B shows that the angle θ of the Light to be emitted from the emission surface relative to the Z-axis direction is 20° and that the angle φ of the light to be emitted from the emission surface relative to the X-axis direction is 90°. In the case of FIG. 7B, the situation in which the light from the emission surface 2d of the light-guide plate 2 is obliquely emitted downward obliquely in the Y-axis direction (direction orthogonal to the arrangement direction of the respective luminous units 3a, 3b (LEDs 10)) is shown.

In the case of FIG. 7A, based on the expression (3), the total light intensity $E_{total}$(θ, φ) of the light to be emitted from the emission surface of the light-guide plate 2 can be expressed by the following expression (5):

$$E_{total}(20°,0°)=\Sigma\Delta Pi(20°,0°)/\Delta\omega \qquad \text{Expression (5)}$$

In addition, in the case of FIG. 7B, the total light intensity $E_{total}$(θ, φ) of the light to be emitted from the emission surface of the light-guide plate 2 can be expressed by the following expression (6):

$$E_{total}(20°,90°)=\Sigma\Delta Pi(20°,90°)/\Delta\omega \qquad \text{Expression (6)}$$

Then, in the present invention, when light fluxes are emitted from the emission surface of the light-guide plate 2, anisotropy in the luminance distribution in the case of FIG. 7A and FIG. 7B is defined like the following expression (7):

$$E_{total}(20°,0°)/E_{total}(20°,90°) \qquad \text{Expression (7)}$$

Specifically, when the angle θ of the light to be emitted from the emission surface 2d relative to the Z-axis direction is 20°, through calculation of a ratio of a value of the total light intensity when the angle φ is 0° to a value of the total light intensity when the angle φ is 90°, a degree of anisotropy in the luminance distribution can be objectively evaluated from the value of this ratio (hereinafter referred to as a "anisotropy evaluation value of the luminance distribution").

Figure 8:
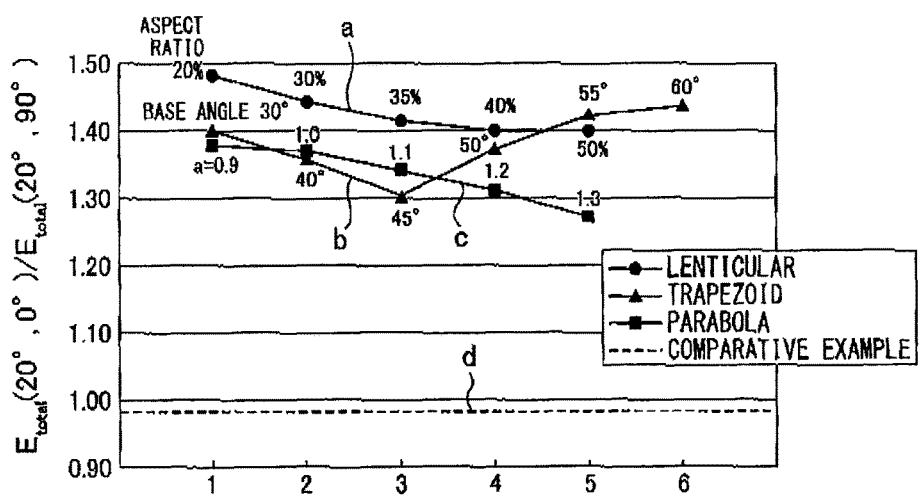
FIG. 8 is a view showing results of a ratio (evaluation values of anisotropy in the luminance distribution) of a total light intensity value when an angle φ is 0° to the total light intensity value when an angle φ is 90°, when an angle θ of the light fluxes emitted from the emission surface of the light-guide late relative to the Z-axis direction is 20°.

FIG. 8 is experimental data showing results of a ratio of a value of the total light intensity when the angle φ is 0° to a value of the total light intensity when the angle φ is 90°, when the angle θ of the light to be emitted from the emission surface 2d relative to the Z-axis direction is 20°. FIG. 8 shows results of anisotropy evaluation values of the luminance distribution when the convex streak 8 formed on the emission surface 2d of the light-guide plate 2 of the above-mentioned illumination device 1 is shaped like the lenticular lens (symbol a), the trapezoid (symbol b), and the parabola (symbol c). Note that the V-shaped concave streaks 7 with the above-mentioned apex angle of 100° are formed on the bottom surface 2c of the light-guide plate 2.

In addition, the symbol d of FIG. 8 represents an anisotropy evaluation value of the luminance distribution for the light-guide plate for comparison. This light-guide plate for comparison has the both faces which are planar and on each of which neither V-shaped concave streaks are formed on the bottom surface nor convex streaks are formed on the emission surface, unlike the present invention, and white dots (scattering dots) called print dots are printed to form a plurality of reflective areas on the bottom surface.

FIG. 8 shows values when the aspect ratio is changed to 20(%), 30(%), 35(%), 40(%) and 50(%) in the case of the lenticular lens shape (symbol a), those when the base angle is changed to 30°, 40°, 45°, 50°, 55°, and 60° in the case of the trapezoid shape (symbol b), and those when the constant a of the quadratic function is changed to 0.9, 1.0, 1.1, 1.2, and 1.3 in the case of the parabola shape (symbol c). Note that the horizontal axis of FIG. 8 shows types (1 to 6) of illumination devices having light-guide plates which are respectively formed by changing these numeric values.

As obvious from the experimental results of the anisotropy evaluation values of the luminance distribution of FIG. 8, in the light-guide plate (configuration having the dot-like reflective areas on the bottom surface) of the symbol d, the anisotropy evaluation value of the luminance distribution is about 0.98, which shows that there is more emission in the direction of $\phi=90°$ than in the direction of $\phi=0°$.

In other words, it shows that there is more emitted light in a direction parallel to a light propagation direction in the light-guide plate and less emitted light in a direction orthogonal to the light propagation direction. In contrast to this, if the convex streak 8 of the emission surface 2d is shaped like the lenticular lens (symbol a), the trapezoid (symbol b), and the parabola (symbol c) like the light-guide plate 2 of the present invention and if the V-shaped concave streaks 7 are formed on the bottom surface 2c, the anisotropy evaluation value of the luminance distribution is about 1.2 to 1.9 any of which is 1 or higher.

Specifically, it is indicated that if the light-guide plate of the present invention is used, there is more emission in the direction of $\phi=0°$ than in the direction of $\phi=90°$. In other words, it is indicated that there is more emitted light in the direction orthogonal to the light propagation direction in the light-guide plate and that performance widely differs. It can be determined that the light-guide plate of the present invention has more anisotropy in the luminance distribution than the light-plate guide for comparison (symbol d).

Thus, since it can be determined that the illumination device has the anisotropy in the luminance distribution when the above-mentioned anisotropy in the luminance distribution (Etotal(20°, 0°)/Etotal(20°, 90°)) expression (7)) is at least 1.2 or higher, the condition (2) described above is as follows:

$$E_{total}(20°,0°)/E_{total}(20°,90°)>1.2 \quad \text{Condition (2),}$$

In this manner, since the V-shaped concave streaks 7 are formed on the bottom surface 2c of the light-guide plate 2, the trapezoid-shaped (or the lenticular lens shaped or the parabola-shaped) convex streaks 8 are formed on the emission surface 2d of the light-guide plate 2, and setting is such performed that the above-mentioned conditions (1), (2) are fulfilled, the edge-light type illumination device 1 having the excellent direct-underneath luminance and having anisotropy in the luminance distribution can be provided.

Figure 9:
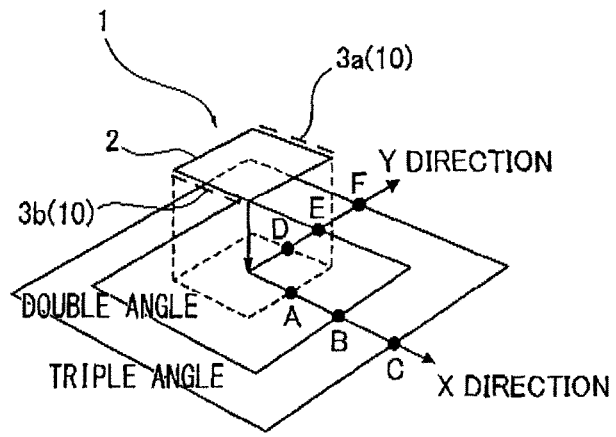
FIG. 9 is a view for illustrating measurement of irregular luminance of an edge-light type illumination device.

As described above, the edge-light type illumination device 1 of the present invention has anisotropy in the luminance distribution. Then, the illumination device 1 is installed on a ceiling as shown in FIG. 9, and luminance irregularity is measured directly thereunder in peripheral areas along the Y-axis direction (direction parallel to the arrangement direction of the respective luminous units 3a, 3b (LEDs 10)) and the Y-axis direction (direction orthogonal to the arrangement direction of the respective luminous units 3a, 3b (LEDs 10)). In addition, the illumination device 1 shown in FIG. 9 is shaped like a square one side of which is 600 mm, and installed on the ceiling which is 2 m above a floor (measurement surface).

Figure 10A:
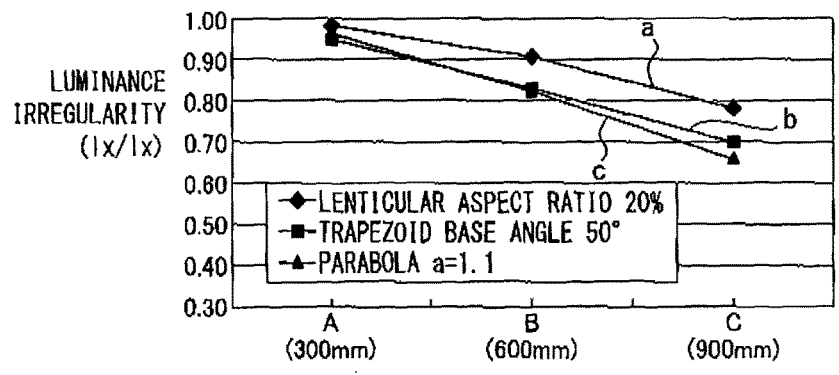
FIG. 10A is a view showing measurement results of luminance irregularity in the X-axis direction.
Figure 10B:
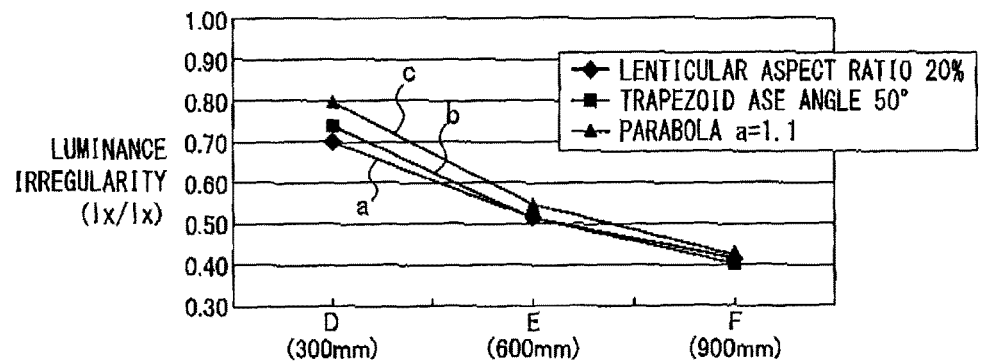
FIG. 10B is a view showing measurement results of the luminance irregularity in the Y-axis direction.

FIG. 10A shows measurement results of the luminance irregularity in the X-axis direction when the convex streaks 8 formed on the emission surface 2d of the light-guide plate 2 of the above-mentioned illumination device 1 are shaped like the lenticular lens (symbol a), the trapezoid (symbol b), and the parabola (symbol c). FIG. 10B shows measurement results of the luminance irregularity in the Y-axis direction. Note that the above-mentioned V-shaped concave streaks 7 having the apex angle of 100° are formed on the bottom surface 2c of the light-guide plate 2. In FIG. 10A and FIG. 10B, the aspect ratio of the lenticular lens shape (symbol a) is 20(%), the base angle of the trapezoid shape (symbol b) is 50°, and the constant a of the quadratic function of the parabola shape (symbol c) is 1.1.

In addition, A, B, and C on the horizontal axis of FIG. 10A are measurement positions (300 mm, 600 mm, 900 mm) from the direct-underneath area in the X-axis direction, and D, E, and F on the horizontal axis of FIG. 10B are measurement positions (300 mm, 600 mm, 900 mm) from the direct-underneath area in the Y-axis direction.

In FIG. 10A and FIG. 10B, it is meant that relative to the luminance underneath the illumination device 1 (when the luminance irregularity is 1.00), luminance decreases as this numeric value becomes smaller from 1.00. Specifically, the closer to 1.00 the numeric value of the luminance irregularity is, the closer to the direct-underneath luminance the luminance is, and the smaller the numeric value of the luminance irregularity is, the lower the luminance is.

Therefore, in the X-axis direction as shown in FIG. 10A, the luminance irregularity is about 0.65 to 0.78 even at the measurement position C (900 mm), and the luminance has not decreased particularly. On the one hand, in the Y-axis direction as shown in FIG. 10B, the luminance irregularity is about 0.40 at the measurement position C (900 mm), and the luminance has decreased more considerably than in the X-axis direction.

Thus, the edge-light type illumination device 1 of the present invention can illuminate by increasing uniformity in the luminance distribution relative to the X-axis direction, and having large anisotropy in the luminance distribution in the Y-axis direction.

EXAMPLES

Example 1

According to the method described in the example in Patent Application No. WO2006/013969, a stamper 1 on the side of an emission surface was fabricated by forming concave-streak patterns having height H of 0.02 mm, a flat area of 0.02 mm on a crown face, a slant angle of a slant of 50°, and a trapezoid-shaped cross section, the trapezoid-shaped concave-streak patterns being 0.054 mm wide and having a flat area of 0.006 mm between adjacent patterns.

On the one hand, a stamper on the side of a bottom surface (hereinafter referred to as a stamper 2) was fabricated by arranging prism patterns having height of 0.006 mm and an apex angle of 100° (slant angle R=40°) at predetermined intervals, similarly forming nickel electroformed layers, and stripping this original board.

A light-guide plate was obtained with an injection molding method, by incorporating these stamper 1 and stamper 2, as a transfer mold, into a die fixing-side cavity and a die-movable side cavity of an injection molding machine. The outside dimensions of the obtained light-plate guide were 600 in breadth×600 in length×3 (mm) in height.

On the light-guide plate, convex streaks and concave streaks whose emission surfaces are trapezoid-shaped are arranged alternately. On the bottom surface, the V-shaped concave streaks are 0.006 mm high, average gradient to a bottom surface of a slant parallel to the X-axis on the side of a light-receiving end face of the concave streak, which corresponds to an average base angle, is 40°, and pitch of the V-shaped concave streak was varied so as to gently and gradually decrease from 0.557 mm on the side of the light-receiving end face to 0.121 mm on the central area of the light-guide plate.

In addition, as a luminous unit, a multi-chip LED module (outside dimension of 13.7 mm, illuminated length 11.4 mm) manufactured by SANKEN ELECTRIC CO., LTD. and having the model number SEPWA2001 was used.

In order to form a primary light source, 43 luminous units were arranged at regular intervals (13.9 mm) and end faces parallel to the concave-streak patterns on the bottom surface of the light-guide plate were made light-receiving end faces. Then, the light-receiving end faces were arranged parallel to the X-axis, and the primary light source was arranged along these two opposed light-receiving end faces. Since the luminous units were arranged on the two opposed light-receiving end faces, a total of 86 units, 2×43=86, of luminous units were used.

Then, reflective sheet 4 (manufactured by Toray Industries, Inc.: Model No. E6SL) was arranged on the bottom surface 2c of the light-guide plate, and these members were housed in a metal frame. Then, a back metal frame was combined from above this by supporting frames made of polystyrene.

In the illumination device thus formed, optical performance was measured by connecting an inverter to each luminous unit so that it could be connected to a 100V plug. All light fluxes were measured by placing the illumination device in an integrating sphere manufactured by Labsphere, Inc. This measured value was divided by $2\pi$ to obtain the average intensity.

The intensity was measured by using a luminance meter (manufactured by Konica Minolta Sensing Inc.: CA2000). The measuring instrument was installed at a position which is 3 m spaced from the center of the light-guide plate. A brightness measurement area was determined so as to contain a luminous area of the light-guide plate, and the average brightness is determined. The intensity was obtained by multiplying this average brightness by an artificial measurement area. For the intensity, in a direction inclined at 20° to a normal direction of the emission surface of the light-guide plate, relative to the center of the luminous surface of the light-guide plate, the intensity E(20°, 0°) when the plate was inclined to the X-axis direction, the intensity E(20°, 90°) when it was inclined to the Y-axis direction, and the intensity E(θ=0) in the front direction were measured.

As a result of this, the direct-underneath luminance evaluation value was 3.86, and the anisotropy evaluation value of the luminance distribution: E(20°, 0°)/E(20°, 90°) was 1.37.

In addition, on a plane spaced 2 m from the illumination device, an illuminance meter (manufactured by Konica Minolta Sensing Inc.: T-10M) was placed at positions A, B, C, D, E, F as shown in FIG. 9 as well as directly under the illumination device, luminance was measured, and luminance ratios of A/D, B/E and C/F were obtained.

As a result of this, the direct-underneath luminance was 200 lx, A/D=1.28, B/E=1.64, C/F=1.76, and there was anisotropy in the luminance distribution.

Example 2

With the concave streaks formed on the stamper on the emission side in Example 1 as a lenticular pattern, a light-guide plate is fabricated by variously changing only the aspect ratio thereof. Note that the lenticular pattern of the concave streaks is 0.05 mm wide and has a flat surface of 0.001 mm between adjacent patterns.

Table 1 is a summary of results of optical evaluation conducted, which were obtained through calculation of numeric values, assuming that the obtained light-guide plate was incorporated in the same illumination device as Example 1. The calculation of numeric values was performed by defining the conditions so as to correspond to actually measured values of Example 1.

TABLE 1

|  | Aspect ratio (%) | | | | |
| --- | --- | --- | --- | --- | --- |
|  | 20 | 30 | 35 | 40 | 50 |
| Direct-underneath luminance evaluation value | 2.68 | 3.11 | 3.24 | 3.32 | 3.45 |
| Anisotropy evaluation value | 1.48 | 1.44 | 1.41 | 1.39 | 1.40 |
| Direct-underneath luminance (1x) | 179 | 189 | 193 | 197 | 197 |
| A/D | 1.40 | 1.34 | 1.33 | 1.82 | 1.31 |
| B/E | 1.77 | 1.71 | 1.65 | 1.63 | 1.62 |
| C/F | 1.91 | 1.81 | 1.74 | 1.72 | 1.64 |

In any case, the direct-underneath luminance evaluation value was 2 or higher, the anisotropy evaluation value was 1.2 or higher, and the luminance ratios on the luminance evaluation surface which was 2 m below also showed anisotropy.

Example 3

A light-guide plate is fabricated by changing the concave-streak patterns formed on the stamper on the emission side in Example 1 to those with concave streaks having a parabola-shaped cross section. The parabola-shaped cross section was defined by $y=ax^2$, and a coefficient was variously changed. Note that the parabola-shaped patterns are 0.05 mm wide and have a flat surface of 0.001 mm between adjacent patterns.

Table 2 is a summary of results of optical evaluation conducted, which were obtained through calculation of numeric values, assuming that the obtained light-guide plate was incorporated in the same illumination device as Example 1.

TABLE 2

| | Coefficient a | | | | |
|---|---|---|---|---|---|
| | 0.9 | 1.0 | 1.1 | 1.2 | 1.3 |
| Direct-underneath luminance evaluation value | 4.19 | 4.30 | 4.27 | 4.17 | 4.01 |
| Anisotropy evaluation value | 1.38 | 1.37 | 1.34 | 1.13 | 1.27 |
| Direct-underneath luminance (1x) | 217 | 219 | 218 | 210 | 202 |
| A/D | 1.28 | 1.24 | 1.21 | 1.19 | 1.15 |
| B/E | 1.60 | 1.58 | 1.51 | 1.47 | 1.40 |
| C/F | 1.63 | 1.59 | 1.55 | 1.54 | 1.47 |

In any case, the direct-underneath luminance evaluation value was 2 or higher, the anisotropy evaluation value was 1.2 or higher, and the luminance ratios on the luminance evaluation surface which was 2 m below also showed anisotropy.

Example 4

A light-guide plate was fabricated by changing the concave-streak patterns formed on the stamper on the emission side in Example 1 to those with concave streaks having a curved cross section following the expression (8) below. Note that the curved patterns are 0.06 mm wide and have a flat surface of 0.001 mm between adjacent patterns.

$$y = \frac{Cx^2}{1 + \sqrt{1 - (K+1)C^2x^2}} + Dx^4 + Ex^6 + Fx^8 + Gx^{10} \ldots + Mx^{20}$$ [Math 1]

$K = -1$ $C = 47.31523$

Quartic D=−29846
Sextic E=362207392
Eight-degree F=−2776608932701
Tenth-degree G=8967392099183360
Twelfth-degree H=−22138674875790700000
Fourteenth-degree I=3.4149338436526×$10^{22}$
Sixteenth-degree J=−3.18652196429692×$10^{25}$
Eighteenth-degree L=1.64310378517547×$10^{28}$
Twentieth-degree M=−3.5868000886891×$10^{30}$ The optical evaluation was conducted by incorporating the obtained light-guide plate into the same illumination device as Example 1. As a result of this, the direct-underneath luminance evaluation value was 3.68 and the anisotropy evaluation value of the luminance distribution was 1.32.

In addition, the direct-underneath luminance was 206 lx, A/D=1.27, B/E=1.52 and C/F=1.57, and there was anisotropy in the luminance distribution.

Example 5

This is the case in which the concave streaks formed on the stamper on the emission side in Example 2 was fixed to the lenticular patterns with the aspect ratio of 20% and the apex angle of the V-shaped concave streaks on the bottom surface of the light-guide plate was changed.

Table 3 is a summary of results of optical evaluation conducted, which were obtained through calculation of numeric values, assuming that the obtained light-guide plate was incorporated in the same illumination device as Example 1.

TABLE 3

| | V-shaped concave streak apex angle (°) | | | | |
|---|---|---|---|---|---|
| | 70 | 75 | 85 | 100 | 105 |
| Direct-underneath luminance evaluation value | 3.84 | 4.08 | 4.56 | 2.84 | 1.71 |
| Anisotropy evaluation value | 1.07 | 1.63 | 1.88 | 1.44 | 0.98 |
| Direct-underneath luminance (1x) | 163 | 182 | 206 | 179 | 137 |
| A/D | 0.99 | 1.00 | 1.20 | 1.40 | 1.10 |
| B/E | 0.99 | 1.05 | 1.53 | 1.77 | 1.38 |
| C/F | 1.18 | 1.66 | 2.00 | 1.91 | 1.70 |
| Judgment | Out of the range | Within the range | Within the range | Within the range | Out of the range |

When the apex angle of the V-shaped concave streak was 75°, 85° and 100°, the direct-underneath luminance evaluation value and the anisotropy evaluation value both fulfilled the condition. However, when the apex angle of the V-shaped concave streak was 105°, the direct-underneath luminance evaluation value and the anisotropy evaluation value both did not fulfill the condition, and the value of the direct-underneath luminance, in particular, was low. In addition, when the apex angle of the V-shaped concave streak was 70°, the anisotropy evaluation value of the luminance distribution did not fulfill the condition, and the luminance distribution was also isotropic.

Example 6

This is the case in which the concave streaks formed on the stamper on the emission side in Example 2 was fixed to the pattern defined by the expression (8) and s the apex angle of the V-shaped concave streaks on the bottom surface of the light-guide plate was changed.

Table 4 is a summary of results of optical evaluation conducted, which were obtained through calculation of numeric values, assuming that the obtained light-guide plate was incorporated in the same illumination device as Example 1.

TABLE 4

| | V-shaped concave streak apex angle (°) | | | | |
|---|---|---|---|---|---|
| | 70 | 80 | 95 | 100 | 105 |
| Direct-underneath luminance evaluation value | 4.21 | 4.70 | 4.96 | 3.68 | 2.91 |
| Anisotropy evaluation value | 0.96 | 1.36 | 1.52 | 1.32 | 1.05 |
| Direct-underneath luminance (1x) | 181 | 200 | 210 | 206 | 177 |
| A/D | 0.95 | 1.00 | 1.24 | 1.27 | 1.11 |
| B/E | 0.93 | 1.10 | 1.47 | 1.52 | 1.31 |
| C/F | 0.98 | 1.37 | 1.53 | 1.57 | 1.40 |
| Judgment | Out of the range | Within the range | Within the range | Within the range | Out of the range |

When the apex angle of the V-shaped concave streak was 80°, 95° and 100°, the direct-underneath luminance evaluation value and the anisotropy evaluation value both fulfilled the condition. However, when the apex angle of the V-shaped concave streak was 70° and 105°, the anisotropy evaluation value did not fulfill the condition, and the luminance distribution was also isotropic.

Example 7

This is the case in which the concave streaks formed on the stamper on the emission side in Example 3 was fixed to the pattern for which the quadratic coefficient of parabola is defined by 1.1 and the apex angle of the V-shaped concave streaks on the bottom surface of the light-guide plate was changed.

Table 5 is a summary of results of optical evaluation conducted, which were obtained through calculation of numeric values, assuming that the obtained light-guide plate was incorporated in the same illumination device as Example 1.

TABLE 5

|  | V-shaped concave streak apex angle (°) | | | | |
| --- | --- | --- | --- | --- | --- |
|  | 70 | 75 | 80 | 100 | 105 |
| Direct-underneath luminance evaluation value | 4.21 | 4.51 | 4.75 | 4.27 | 3.41 |
| Anisotropy evaluation value | 0.94 | 1.30 | 1.31 | 1.34 | 1.26 |
| Direct-underneath luminance (1x) | 183 | 199 | 211 | 218 | 193 |
| A/D | 0.96 | 0.99 | 0.99 | 1.21 | 1.16 |
| B/E | 0.93 | 0.98 | 1.10 | 1.51 | 1.36 |
| C/F | 0.92 | 1.25 | 1.30 | 1.55 | 1.49 |
| Judgment | Out of the range | Within the range | Within the range | Within the range | Within the range |

When the apex angle of the V-shaped concave streak was 80°, 100°, and 105°, the direct-underneath luminance evaluation value and the anisotropy evaluation value of the luminance distribution both fulfilled the condition.

When the apex angle of the V-shaped concave streak was 75°, luminance uniformity in a double-angle area in FIG. 9 was high, luminance was almost uniform, and anisotropy in the luminance distribution appeared from outside of this double-angle area (outside of a triple-angle area). In addition, when the apex angle of the V=shaped concave streak was 70°, the condition for the anisotropy evaluation value in the luminance distribution was not fulfilled, and the luminance distribution was such that there was somewhat more emission in a direction parallel to a light guiding direction (Y-axis direction).

Comparative Example 1

This comparative example is the case in which a light-guide plate was fabricated by adding print dots on a bottom surface of a flat board (board thickness of 3 mm) made of PMMA.

On the bottom surface of the light-guide plate, white print dots which were made rough and dense so as to become denser as they move farther from the light-receiving end face were provided (the dot density was highest at the central part of the light-guide plate) and the brightness distribution was made predetermined distribution. The optical evaluation was conducted with the obtained light-guide plate incorporated in the same illumination device 1 as Example 1.

As a result of this, the direct-underneath luminance evaluation value was 1.80, the anisotropy evaluation value in the luminance distribution was 0.98, emission components in the direction parallel to the Y-axis was more than the emission components in the direction parallel to the X axis, and the distribution was opposite to the device of the present invention.

In addition, the direct-underneath luminance was 118 lx, A/D=0.97, B/E=0.98, C/F=0.98, and the luminance distribution was almost isotropic.

CROSS-REFERENCE TO RELATED APPLICATION

This application claims the benefit of Japanese Patent Application No. 2012-86845 filed to the Japan Patent Office on Apr. 5, 2012, which is herein incorporated by reference in its entirety.

REFERENCE SIGNS LIST

1 Illumination device
2 Light-guide plate
2c Bottom surface
2d Emission surface
3a, 3b Luminous unit
4 Reflective sheet
5 Diffusion sheet
7 Concave streak
8 Convex streak
10 LED

The invention claimed is:

1. An edge-light type illumination device comprising:
a light-guide plate; and
a primary light source installed on the side of at least one side face of the light-guide plate, in which the light-guide plate has an emission surface, a bottom surface opposed to the emission surface, and a light-receiving end face for receiving light emitted from the primary light source provided on the side of the at least one side face,
wherein
a normal line of an X-Y plane constituted of an X-axis and a Y-axis orthogonal to the X-axis is represented as a Z-axis, the primary light source is arranged parallel to the X-axis, the light-guide plate is arranged parallel to the X-Y plane, and the light-receiving end face of the light-guide plate is parallel to an X-Z plane,
the light-guide plate has a plurality of concave-streak patterns formed at a predetermined pitch on the bottom surface and parallel to an X-axis direction and a plurality of convex-streak patterns formed at a predetermined pitch on the emission surface and parallel to a Y-axis direction,
an average intensity of light to be emitted from the emission surface of the light-guide plate is $E_m$ and a total light intensity of the light to be emitted from the emission surface of the light-guide plate in a Z-axis direction is $E_{total}$, the light to be emitted from the emission surface of the light-guide plate fulfils a condition (1) shown below, and
the total light intensity $E_{total}$ (20°, 0°) of the light to be emitted from the emission surface of the light-guide plate is $$E_{total}(20°,0°)=\Sigma\Delta Pi(20°,0°)/\Delta\omega$$

wherein an angle θ of the light to be emitted from the emission surface of the light-guide plate relative to the Z-axis direction is 20° and an angle φ of the light to be emitted from the emission surface relative to the X-axis direction is 0°, and the total light intensity $E_{total}$ (20°, 90°) of the light to be emitted from the emission surface of the light-guide plate is $$E_{total}(20°,90°)=\Sigma\Delta Pi(20°,90°)/\Delta\omega$$

wherein the angle θ of the light to be emitted from the emission surface of the light-guide plate relative to the Z-axis direction is 20° and the angle φ of the light to be emitted from the emission surface relative to the X-axis direction is 90°, the light to be emitted from the emission surface of the light-guide plate also fulfils a condition (2) shown below such that the light emitted from the emission surface of the light guide plate has the following high luminance and anisotropy to luminance distribution conditions:

$$E_{total}/E_m > 2.0 \quad \text{Condition (1)}$$

$$E_{total}(20°,0°)/E_{total}(20°,90°) > 1.2 \quad \text{Condition (2),}$$

provided that the ΔPi (θ, φ) is a light flux emitted into a minute solid angle of Δω from each compartment in a (θ, φ) direction when the emission surface of the light-guide plate is partioned to a plurality of minute compartments, and Σ is a sum of the plurality of minute compartments of the emission surface of the light-guide plate.

2. The illumination device according to claim 1, wherein each of the convex-streak patterns formed on the emission surface of the light-guide plate has a cross section shaped like a trapezoid or a lenticular lens or a parabola.

3. The illumination device according to claim 1 wherein each of the concave-streak patterns formed on the bottom surface of the light-guide plate has a V-shaped cross section and an apex angle is set to 75° to 105°.

4. The illumination device according to claim 3 wherein the concave-streak patterns arranged more densely as they move away from the light-receiving end face.

5. The illumination device according to claim 1, comprising:
a reflective sheet for reflecting light on the side of the bottom surface of the light-guide plate; and
an optical sheet on the side of the emission surface of the light-guide plate.

6. The illumination device according to claim 1, comprising a reflective sheet for reflecting light on the side of the bottom surface of the light-guide plate.

7. The illumination device according to claim 1 wherein the illumination device is configured to be mounted on a ceiling to be used as a ceiling illumination.

8. The illumination device according to claim 1, wherein each of the convex-streak patterns formed on the emission surface of the light-guide plate has a cross section shaped like a curved line following the expression shown below:

$$y = \frac{Cx^2}{1+\sqrt{1-(K+1)C^2x^2}} + Dx^4 + Ex^6 + Fx^8 + Gx^{10} \ldots + Mx^{20}$$

$K=-1$ $C=47.31523$

Quartic D=−29846
Sextic E=362207392
Eight-degree F=−2776608932701
Tenth-degree G=8967392099183360
Twelfth-degree H=−22138674875790700000
Fourteenth-degree I=3.4149338436526×10^{22}
Sixteenth-degree J=−3.18652196429692×10^{25}
Eighteenth-degree L=1.64310378517547×10^{28}
Twentieth-degree M=−3.5868000886891×10^{30}.

* * * * *